United States Patent
Basavanhally et al.

(10) Patent No.: US 7,231,106 B2
(45) Date of Patent: Jun. 12, 2007

(54) APPARATUS FOR DIRECTING AN OPTICAL SIGNAL FROM AN INPUT FIBER TO AN OUTPUT FIBER WITHIN A HIGH INDEX HOST

(75) Inventors: Nagesh R. Basavanhally, Skillman, NJ (US); Dan M. Marom, Hwell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/239,940

(22) Filed: Sep. 30, 2005

(65) Prior Publication Data

US 2007/0077002 A1    Apr. 5, 2007

(51) Int. Cl.
G02B 6/26    (2006.01)
G02B 6/42    (2006.01)

(52) U.S. Cl. .......................................... 385/18; 385/17
(58) Field of Classification Search .................. 385/18
See application file for complete search history.

(56) References Cited

U.S. PATENT DOCUMENTS

| | | | | |
|---|---|---|---|---|
| 6,137,926 A | * | 10/2000 | Maynard | 385/18 |
| 6,175,667 B1 | * | 1/2001 | Wang et al. | 385/3 |
| 6,618,517 B2 | * | 9/2003 | Ducellier et al. | 385/17 |
| 6,690,885 B1 | * | 2/2004 | Aksyuk et al. | 398/45 |
| 6,931,170 B2 | * | 8/2005 | Yun et al. | 385/18 |
| 2002/0061158 A1 | * | 5/2002 | Ducellier | 385/17 |
| 2004/0136644 A1 | * | 7/2004 | Fouquet et al. | 385/18 |

* cited by examiner

*Primary Examiner*—Michelle Connelly-Cushwa
*Assistant Examiner*—Chris Chu (57) ABSTRACT

The invention includes an apparatus for receiving an optical signal from an optical input means and directing the optical signal to one of a plurality of optical output means. The apparatus includes a solid signal propagating material having a refractive index greater than the refractive index of air. The solid signal propagating material includes a first transparent surface optically cooperating with the optical input and output means, a second transparent surface optically cooperating with a first light directing mechanism, and a reflective surface optically cooperating with the first light directing mechanism. A first reflecting component of the light directing mechanism directs a received optical signal to a second reflecting component of the light directing mechanism via the reflective surface of the signal propagating material. The second reflecting component of the light directing mechanism directs the respective incident optical signal to the selected one of the plurality of optical output means.

20 Claims, 4 Drawing Sheets

APPARATUS FOR DIRECTING AN OPTICAL SIGNAL FROM AN INPUT FIBER TO AN OUTPUT FIBER WITHIN A HIGH INDEX HOST

FIELD OF THE INVENTION

The invention relates to the field of communication networks and, more specifically, to the switching of optical signals in optical cross-connect systems.

BACKGROUND OF THE INVENTION

In general, optical cross-connect (OXC) switches are used in optical networking for routing guided light from input optical fibers to output optical fibers. In existing OXC switches, after leaving the input fiber and before entering the output fiber, a light beam propagates in a free-space region. The free-space region is typically air, a noble gas (e.g., argon), or vacuum. Since each of these selections exhibits an optical refractive index of approximately one, light beam divergence properties are dictated by this low optical refractive index.

Disadvantageously, the refractive components in existing OXC systems contribute to optical losses. For example, in optical cross-connect switches using micromirror arrays, each micromirror array is individually packaged with a transparent refractive lid which introduces an additional source of optical loss. Although existing OXC switches may employ anti-reflective coatings for reducing optical losses from refractive components, anti-reflective coatings cannot completely eliminate such optical losses for finite temporal and spatial bandwidth.

Furthermore, existing OXC systems operate in ambient environments susceptible to temperature and pressure variations affecting beam propagation properties. Similarly, existing OXC assemblies require use of opto-mechanical alignment apparatuses that are susceptible to creep, vibration, and temperature dependencies. Moreover, since components of existing OXC systems are typically coupled to metal housings, existing OXC systems may be structurally and mechanically unstable.

SUMMARY OF THE INVENTION

Various deficiencies in the prior art are addressed through the invention of an apparatus for receiving an optical signal from an optical input means and directing the optical signal to one of a plurality of optical output means. A first apparatus includes a solid signal propagating material having a refractive index greater than the refractive index of air. The solid signal propagating material includes a first transparent surface optically cooperating with the optical input and output means, a second transparent surface optically cooperating with a first light directing mechanism, and a reflective surface optically cooperating with the first light directing mechanism. A first reflecting component of the light directing mechanism directs a received optical signal to a second reflecting component of the light directing mechanism via the reflective surface of the signal propagating material. The second reflecting component of the light directing mechanism directs the respective incident optical signal to the selected one of the plurality of optical output means.

A second apparatus includes a solid signal propagating material having a refractive index greater than a refractive index of air. The solid signal propagating material includes a first transparent surface optically cooperating with the optical input means, a second transparent surface optically cooperating with the optical output means, a third transparent surface optically cooperating with a first light directing mechanism, and a fourth transparent surface optically cooperating with a second light directing mechanism. A first reflecting component of the first light directing mechanism directs the received optical signal to a second reflecting component of the second light directing mechanism. The second reflecting component of the second light directing mechanism directs the respective incident optical signal to the selected one of the plurality of optical output means.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of an optical cross-connect system; however, the present invention can be readily applied to other optical systems. The present invention includes an apparatus for routing a light beam from an input fiber to an output fiber. The apparatus includes a signal propagating portion formed from a solid, transparent material having a refractive index greater than one (e.g., glass). The apparatus utilizes a pair of microlenses in a light beam path for first collimating and then focusing the light beam. The apparatus utilizes a pair of tilting micromirrors in a light beam path for directing the light beam in the collimated regime. Although primarily described herein with respect to glass, various other solid, transparent materials may be used for routing a beam from an input fiber to an output fiber in accordance with the methodologies of the present invention.

In accordance with the present invention, use of a solid, transparent material having a refractive index greater than one as the signal propagating portion for routing a light beam from an input fiber to an output fiber provides various advantages. The solid, transparent, higher-index material reduces beam divergence in free-space propagation, thereby relaxing numerous optical design constraints, including enabling the use of smaller diameter micromirrors as the light beam directing mechanism. In one embodiment, the solid, transparent, higher-index material is homogeneous and isotropic. The solid, transparent, higher-index material enables components to be adhesively coupled to the material, thereby increasing rigidity for improving structural and mechanical stability, reducing temperature and pressure dependencies, easing packaging, and providing like benefits.

Figure 1:
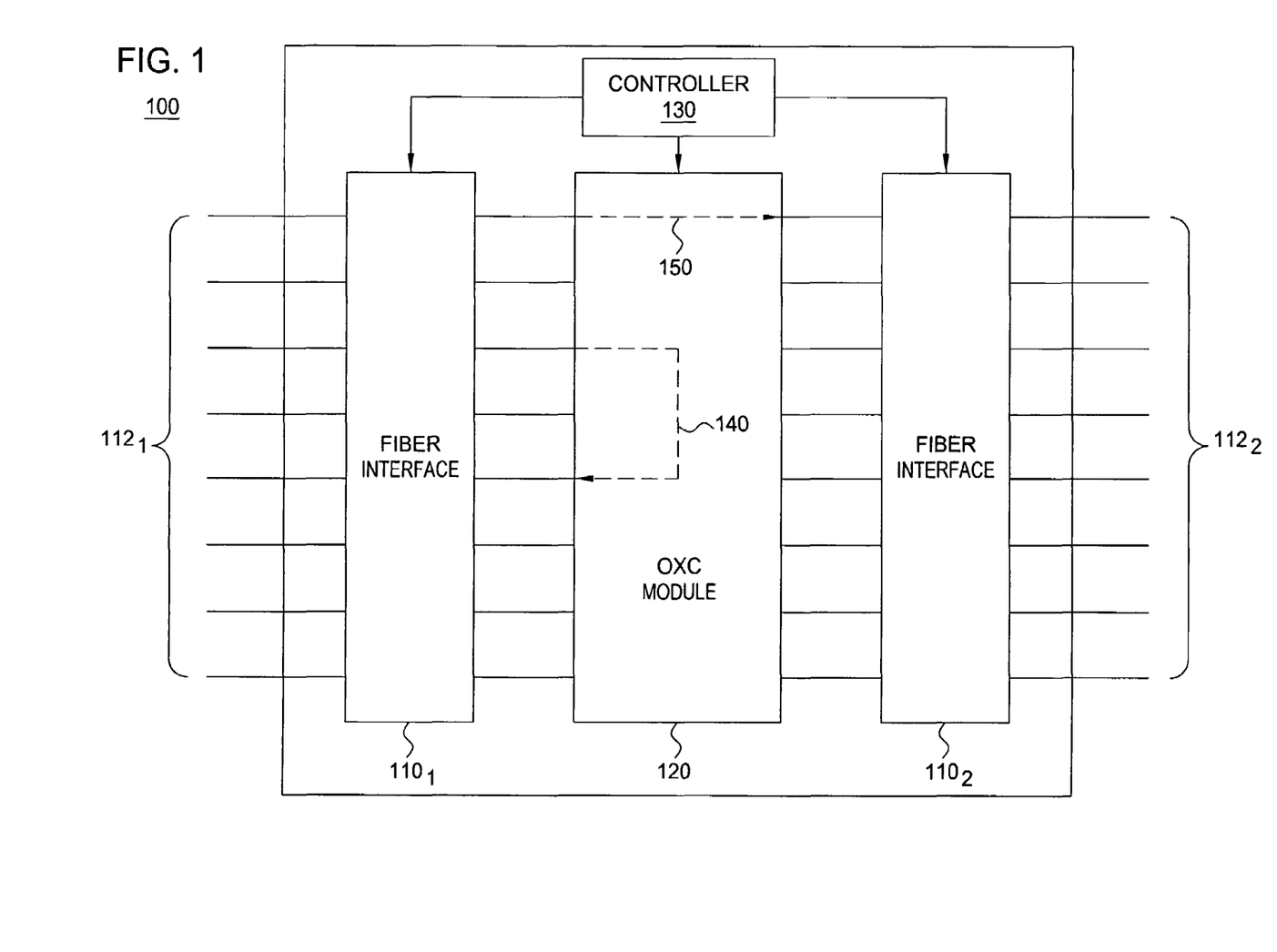
FIG. 1 depicts a high-level block diagram of an optical cross-connect system.

FIG. 1 depicts a high-level block diagram of an optical cross-connect system. Specifically, optical cross-connect system 100 of FIG. 1 comprises a first fiber interface $110_1$, a second fiber interface $110_2$, an optical cross-connect (OXC) module 120, and a controller 130. The first fiber interface $110_1$ couples a first plurality of optical fibers $112_1$ (collectively, first optical fibers $112_1$) to OXC module 120. The second fiber interface $110_2$ couples a second plurality of optical fibers $112_2$ (collectively, second optical fibers $112_2$) to OXC module 120. In one embodiment, OXC module 120 is adapted for switching an optical signal from an input optical fiber to one of a plurality of output optical fibers.

In one embodiment, switching of optical signals between optical fibers is performed using one fiber interface. In one such embodiment, depicted and described in detail with respect to FIG. 2 and FIG. 3, a first portion of first optical fibers $112_1$ function as input optical fibers and a second portion of first optical fibers $112_1$ function as output optical fibers. In this embodiment, as depicted in FIG. 1, OXC module 120 switches an optical signal from one of optical fibers in the first portion of first optical fibers $112_1$ to one of the optical fibers in the second portion of first optical fibers $112_1$ via a signal propagation path 140.

In one embodiment, switching of optical signals between optical fibers is performed using two fiber interfaces (i.e., an input fiber interface and an output fiber interface). In one such embodiment, depicted and described in detail with respect to FIG. 4, first optical fibers $112_1$ function as input optical fibers and second optical fibers $112_2$ function as output optical fibers. In this embodiment, as depicted in FIG. 1, OXC module 120 switches an optical signal from one of the first optical fibers $112_1$ to one of the second optical fibers $112_2$ via a signal propagation path 150.

The controller 130 is adapted for receiving and processing commands from other modules and systems (not depicted). The controller 130 is adapted for generating and transmitting commands to associated modules and systems (illustratively, OXC module 120). In one embodiment, in which OXC module 120 uses tilting mirrors for switching optical signals between fibers, controller 130 may communicate with OXC module 120 for controlling respective mirror angles associated with the tilting mirrors. For example, in an embodiment in which OXC module 120 uses micromirror arrays for directing light beams between fibers (i.e., from an input fiber to an output fiber), controller 130 may control the tilt angle of each of the micromirrors in the micromirror array.

Although depicted and described with respect to specific functional components of an optical cross-connect system, the present invention is not intended to be limited to a specific cross-connect system configuration. Furthermore, although depicted and described in the context of an optical cross-connect system, the present invention may be used in various other optical signal processing systems. As such, the optical switching mechanism of the present invention is depicted and described herein with respect to FIG. 2, FIG. 3, and FIG. 4 as a signal propagating material having at least one fiber array incident on at least one respective surface of the signal propagating material.

Figure 2:
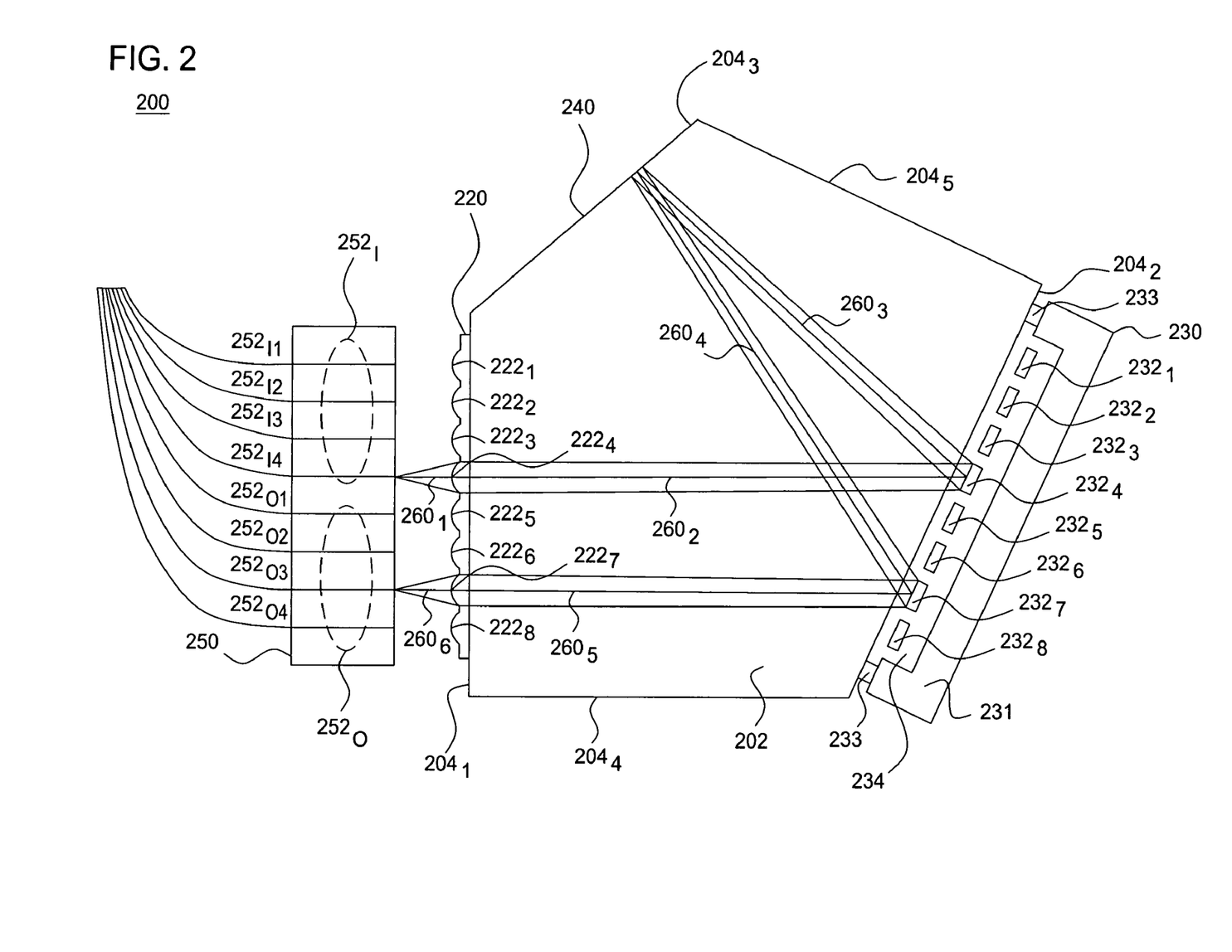
FIG. 2 depicts a high-level block diagram of an optical switching mechanism according to one embodiment of the invention.

FIG. 2 depicts a high-level block diagram of an optical switching mechanism according to one embodiment of the invention. In general, optical switching mechanism 200 of FIG. 2 is adapted for switching guided optical signals from an input optical fiber to one of a plurality of output optical fibers. As depicted in FIG. 2, optical switching mechanism 200 includes a solid signal propagating material 202, a microlens array 220, a micromirror array 230, a flat mirror 240, and a fiber array 250. As depicted in FIG. 2, microlens array 220, micromirror array 230, and flat mirror 240 are coupled (e.g., using an adhesive) to respective surfaces of solid signal propagating material 202.

In one embodiment, solid signal propagating material 202 is a material having a refractive index greater than the refractive index of air. For example, in one embodiment, the solid signal propagating material is glass. As depicted in FIG. 2, solid signal propagating material 202 includes a plurality of surfaces $204_1$–$204_5$ (collectively, surfaces 204).

The surface $204_1$ is transparent. The surface $204_1$ optically cooperates with optical input means and optical output means (illustratively, fiber array 250). The surface $204_1$ optically cooperates with a first light directing mechanism (illustratively, microlens array 220). In one embodiment, the first light directing mechanism includes a plurality of light directing components (illustratively, a plurality of microlenses in microlens array 220). The surface $204_2$ is transparent. The surface $204_2$ optically cooperates with a second light directing mechanism (illustratively, micromirror array 230). In one embodiment, the second light directing mechanism includes a plurality of light reflecting components (illustratively, a plurality of micromirrors in micromirror array 230). The surface $204_3$ is reflective. In one embodiment, surface $204_3$ reflects an optical signal between light reflecting components of the second light directing mechanism.

In one embodiment, surface $204_3$ is a reflective coating applied to the exterior portion of surface $204_3$. In another embodiment, surface $204_3$ is a mirror coupled to solid signal propagating material 202. In one embodiment, surfaces $204_4$ and $204_5$ are not used and may be opaque surfaces. Although depicted as comprising surfaces 204, it should be noted that other surfaces of solid signal propagating material 202 are not depicted due to the two-dimensional depiction of solid signal propagating material 402. Furthermore, solid signal propagating material 202 may include more or less surfaces than depicted and described with respect to FIG. 2. In one embodiment, such additional surfaces are also rendered opaque. The surfaces $204_4$ and $204_5$, as well as additional surfaces not depicted, may be rendered opaque using any of a plurality of techniques as known in the art.

As depicted in FIG. 2, microlens array 220 is coupled to surface $204_1$. In one embodiment, microlens array 220 is coupled to surface 204, using an adhesive. In one such embodiment, the adhesive is an index-matching adhesive (i.e., an adhesive having a refractive index matching both the refractive index of the solid signal propagating material 202 and the refractive index of microlens array 220). The microlens array 220 comprises a plurality of microlenses $222_1$–$222_8$ (collectively, microlenses 222). The microlenses 222 are adapted for directing optical signals from input optical fibers $252_1$ of fiber array 250 to micromirror array 230.

As depicted in FIG. 2, micromirror array 230 includes a housing 231 and a coupler 233. The housing 231 is coupled to coupler 233, which may be disposed along the perimeter of housing 231. The coupler 233 is coupled to surface $204_2$ to form a hermetically sealed region 234. In one embodiment, micromirror array 230 (via coupler 233) is coupled to surface $204_2$ using a bond (e.g., a solder). In one embodiment, hermetically sealed region 234 includes any environment conducive to optical signal propagation. In one embodiment, for example, hermetically sealed region 234 includes a nitrogen environment.

The micromirror array 230 includes a plurality of micromirrors $232_1$–$232_8$ (collectively, micromirrors 232). In one embodiment, each micromirror 232 is a tilting micromirror (i.e., the angle of the micromirror is adjustable for directing an optical signal to different points on mirror 240 and for directing an optical signal from different points on mirror 240). As depicted in FIG. 2, micromirrors 232 are disposed in hermetically sealed region 234. In one embodiment, in which hermetically sealed region 234 includes nitrogen, beam steering angles produced by micromirrors 232 for directing light beams are adapted due to the interface between solid signal propagating material 202 and the hermetically sealed nitrogen region.

As depicted in FIG. 2, each micromirror 232 is individually adjustable such that each micromirror 232 may reflect light beams at a range of reflection angles (i.e., at a range of beam steering angles). In one such embodiment, each micromirror 232 may be tilted in various directions for producing desired beam steering angles for directing a light beam from an input optical fiber to a selected one of a plurality of output optical fibers. In other words, each of the micromirrors 232 is adapted for reflecting a light beam from a respective one of the microlenses 222 to a range of positions on mirror 240. Similarly, each of the micromirrors 232 is adapted for reflecting a light beam from a range of positions on mirror 240 to a respective one of the microlenses 232.

As depicted in FIG. 2, mirror 240 is coupled to surface $204_3$. In one embodiment, mirror 240 is formed by directly metalizing surface $204_3$ (e.g., using evaporation or sputtering). In one embodiment, mirror 240 is coupled to surface $204_3$ using an adhesive. In one such embodiment, the adhesive is an index-matching adhesive (i.e., an adhesive having a refractive index matching the refractive index of solid signal propagating material 202). The mirror 240 directs an optical signal received from a first reflecting component of a light directing mechanism (illustratively, one of the micromirrors 232 of micromirror array 230) towards a second reflecting component of a light directing mechanism (illustratively, another of the micromirrors 232 of micromirror array 230).

As depicted in FIG. 2, optical switching mechanism 200 includes a fiber array 250. The fiber array 250 includes a plurality of input optical fibers $252_{I1}$–$252_{I4}$ (collectively, input optical fibers $252_I$) and a plurality of output optical fibers $252_{O1}$–$252_{O4}$ (collectively, output optical fibers $252_O$). The input optical fibers $252_I$ and output optical fibers $252_O$ are collectively denoted as optical fibers 252. In one embodiment, the optical fibers 252 comprise single mode fibers. As depicted in FIG. 2, fiber array 250 is configured such that each of the optical fibers 252 is incident on respective microlenses 222 of microlens array 220. Specifically, input optical fibers $252_{I1}$–$252_{I4}$ are incident on microlenses $222_1$–$222_4$, respectively, and output optical fibers $252_{O1}$–$252_{O4}$ are incident on microlenses $222_5$–$222_8$, respectively.

As depicted in FIG. 2, a sample optical signal path 260 includes a first portion $260_1$, a second portion $260_2$, a third portion $260_3$, a fourth portion $260_4$, a fifth portion $260_5$, and a sixth portion $260_6$. The sample optical signal path 260 is the beam path traversed by the optical signal from the input optical fiber on which the optical signal is received to the output optical fiber on which the optical signal is transmitted (i.e., from an input optical fiber to a selected one of a plurality of output optical fibers). The sample optical signal path 260 demonstrates the switching of an optical signal between optical fibers using the solid signal propagating material of the present invention.

The first portion $260_1$ includes propagation of a received optical signal from input optical fiber $252_{I4}$ to microlens $222_4$. The second portion $260_2$ includes propagation of the optical signal from microlens $222_4$ to micromirror $232_4$ (i.e., microlens $222_4$ directs the signal towards micromirror $232_4$). The third portion $260_3$ includes propagation of the optical signal from micromirror $232_4$ to mirror 240 (i.e., micromirror $232_4$ directs the signal towards mirror 240). The fourth portion $260_4$ includes propagation of the optical signal from mirror 240 to micromirror $232_7$ (i.e., mirror 240 directs the signal towards micromirror $232_4$). The fifth portion $260_5$ includes propagation of the optical signal from micromirror $232_7$ to microlens $222_7$ (i.e., micromirror $232_7$ directs the signal towards microlens $222_7$). The sixth portion $260_6$ includes transmission of the signal from microlens $220_7$ to output optical fiber $252_{O3}$.

In general, assuming no apertures are encountered, Gaussian beam propagation is an accurate model for light originating from a single mode fiber. The characteristic distance at which a Gaussian beam size expands from its minimum (i.e., beam waist) to a size sqrt(2) larger is defined as the confocal parameter. The confocal parameter (i.e., distance) is directly proportional to n, where n is the refractive index of the medium in which the light beam propagates. In other words, use of glass as the solid signal propagating material enables projection of the beam waist further after the microlens and/or the beam may be focused to a smaller waist. As such, use of a solid signal propagating material having a refractive index greater than the refractive index of air (e.g., using glass) provides numerous advantages.

Figure 3:
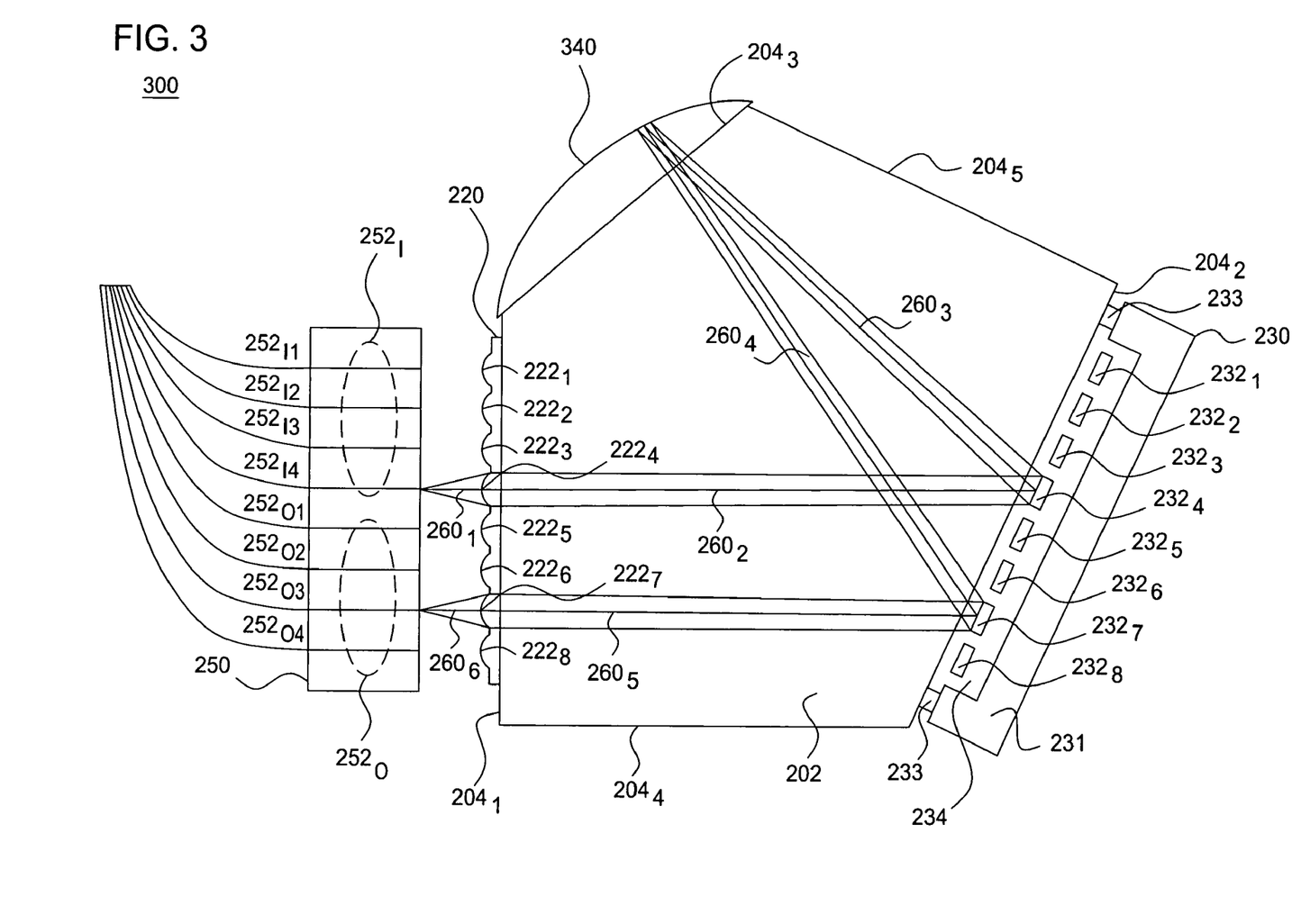
FIG. 3 depicts a high-level block diagram of an optical switching mechanism according to one embodiment of the invention.

FIG. 3 depicts a high-level block diagram of an optical switching mechanism according to one embodiment of the invention. In general, optical switching mechanism 300 of FIG. 3 is substantially similar to optical switching mechanism 200 of FIG. 2. Specifically, optical switching mechanism 300 of FIG. 3 replaces the flat mirror 240 of optical switching mechanism 200 of FIG. 2 with a curved mirror 340. In one embodiment, curved mirror 340 is a plano-concave lens. In one embodiment, the reflective surface of the piano-concave lens is formed by metalizing the curved surface of the piano-concave lens. In one embodiment, curved mirror 340 refocuses the Gaussian beam such that the Gaussian beam waist is at the micromirror array plane, thereby enabling design improvements.

As depicted in FIG. 3, the flat surface of curved mirror 340 is bonded to solid signal propagating material 202 using an adhesive (e.g., glue). In one such embodiment, the adhesive is an index-matching adhesive (i.e., an adhesive having a refractive index matching both the refractive index of the solid signal propagating material 202 and the refractive index of curved mirror 340). The advantages described herein with respect to the apparatus of FIG. 2 are realized with the optical switching mechanism of FIG. 3. Furthermore, additional advantages may be realized using the optical switching mechanism of FIG. 3. For example, the curved surface of the concave mirror provides focusing power.

Figure 4:
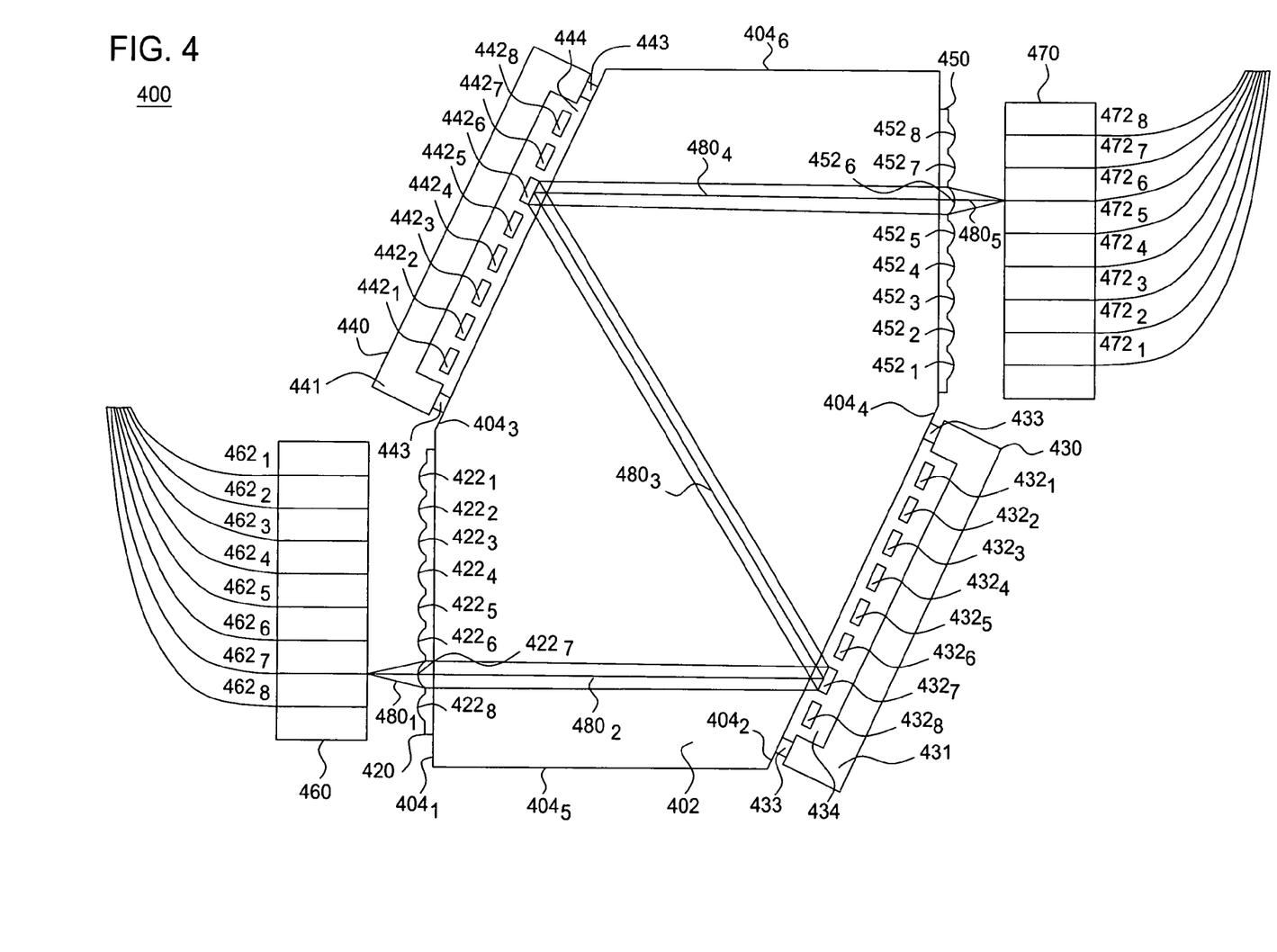
FIG. 4 depicts a high-level block diagram of an optical switching mechanism according to one embodiment of the invention.

FIG. 4 depicts a high-level block diagram of an optical switching mechanism according to one embodiment of the invention. In general, optical switching mechanism 400 of FIG. 4 is adapted for switching guided optical signals from an input optical fiber to one of a plurality of output optical fibers. As depicted in FIG. 4, optical switching mechanism 400 includes a solid signal propagating material 402, an input microlens array 420, an input micromirror array 430, an output micromirror array 440, an output microlens array 450, an input fiber array 460, and an output fiber array 470.

As depicted in FIG. 4, input microlens array 420, input micromirror array 430, output micromirror array 440, and output microlens array 450 are coupled to respective surfaces of solid signal propagating material 402. For example, in one embodiment, input microlens array 420 and output microlens array 450 are adhesively coupled to respective surfaces of solid signal propagating material 202 and input micromirror array 430 and output micromirror array are soldered to respective surfaces of solid signal propagating material 402. As described herein, solid signal propagating material 204 is a material having a refractive index greater than the refractive index of air. For example, in one embodiment, the solid signal propagating material is glass. As depicted in FIG. 4, solid signal propagating material 402 includes a plurality of surfaces $404_1$–$404_6$ (collectively, surfaces 404).

The surface $404_1$ is transparent. The surface $404_1$ optically cooperates with optical input means (illustratively, input fiber array 460). The surface $404_1$ optically cooperates with a first input light directing mechanism (illustratively, input microlens array 420). In one embodiment, the first input light directing mechanism includes a plurality of input light directing components (illustratively, a plurality of input microlenses in microlens array 420). The surface $404_2$ is transparent. The surface $404_2$ optically cooperates with a second input light directing mechanism (illustratively, input micromirror array 430). In one embodiment, the second input light directing mechanism includes a plurality of input light reflecting components (illustratively, a plurality of micromirrors in micromirror array 230).

The surface $404_3$ is transparent. The surface $404_3$ optically cooperates with a first output light directing mechanism (illustratively, output micromirror array 440). In one embodiment, the first output light directing mechanism includes a plurality of output light reflecting components (illustratively, a plurality of output micromirrors in micromirror array 440). The surface $404_4$ is transparent. The surface $404_4$ optically cooperates with a second output light directing mechanism (illustratively, output microlens array 450). In one embodiment, the second output light directing mechanism includes a plurality of output light directing components (illustratively, a plurality of microlenses in microlens array 450). The surface $404_4$ optically cooperates with optical output means (illustratively, output fiber array 470).

In one embodiment, surfaces $404_5$ and $404_6$ are not used and may be opaque surfaces. Although depicted as comprising surfaces 404, it should be noted that other surfaces of solid signal propagating material 402 are not depicted due to the two-dimensional depiction of the solid signal propagating material 402. Furthermore, solid signal propagating material 402 may include more or less surfaces than depicted and described with respect to FIG. 4. In one embodiment, such additional surfaces are also rendered opaque. The surfaces $404_5$ and $404_6$, as well as additional surfaces not depicted, may be rendered opaque using any of a plurality of techniques as known in the art.

As depicted in FIG. 4, input microlens array 420 is coupled to surface $404_1$. In one embodiment, input microlens array 420 is coupled to surface $404_1$ using an adhesive. In one such embodiment, the adhesive is an index-matching adhesive (i.e., an adhesive having a refractive index matching the refractive index of the solid signal propagating material 402). The input microlens array 420 comprises a plurality of input microlenses $422_1$–$422_8$ (collectively, input microlenses 422). The input microlenses 422 are adapted for directing optical signals from input fiber array 460 to input micromirror array 430.

As depicted in FIG. 4, input micromirror array 430 includes a housing 431 and a coupler 433. The housing 431 is coupled to coupler 433, which may be disposed along the perimeter of housing 431. The coupler 433 is coupled to surface $404_2$ to form a hermetically sealed region 434. In one embodiment, input micromirror array 430 (via coupler 433) is coupled to surface $404_2$ using a bond (e.g., a solder). In one embodiment, hermetically sealed region 434 includes any environment conducive to optical signal propagation. In one embodiment, for example, hermetically sealed region 434 includes a nitrogen environment.

As depicted in FIG. 4, input micromirror array 430 includes a plurality of input micromirrors $432_1$–$432_8$ (collectively, input micromirrors 432). In one embodiment, each input micromirror 432 is a tilting micromirror (i.e., the angle of the micromirror is adjustable for directing an optical signal from the input microlenses 422 to associated output micromirrors in output micromirror array 440). As depicted in FIG. 4, input micromirrors 432 are disposed in hermetically sealed region 434. In one embodiment, in which hermetically sealed region 434 includes nitrogen, beam steering angles produced by input micromirrors 432 for directing light beams are adapted due to the interface between solid signal propagating material 402 and the hermetically sealed nitrogen region.

As depicted in FIG. 4, each input micromirror 432 is individually adjustable such that each input micromirror 432 may reflect light beams over a range of reflection angles (i.e., at a range of beam steering angles). In one such embodiment, each input micromirror 432 may be tilted in various directions for producing desired beam steering angles for directing a light beam from an input optical fiber to a selected one of a plurality of output optical fibers. In other words, each of the input micromirrors 432 is adapted for reflecting a light beam from a respective one of the input microlenses 422 to one of a plurality of output micromirrors of output micromirror array 440.

As depicted in FIG. 4, output micromirror array 440 includes a housing 441 and a coupler 443. The housing 441 is coupled to coupler 443, which may be disposed along the perimeter of housing 441. The coupler 443 is coupled to surface $404_3$ to form a hermetically sealed region 444. In one embodiment, output micromirror array 440 (via coupler 443) is coupled to surface $404_3$ using a bond (e.g., a solder). In one embodiment, hermetically sealed region 444 includes any environment conducive to optical signal propagation. In one embodiment, for example, hermetically sealed region 444 includes a nitrogen environment.

The output micromirror array 440 includes a plurality of output micromirrors $442_1$–$442_8$ (collectively, output micromirrors 442). In one embodiment, each output micromirror 442 is a tilting micromirror (i.e., the angle of the micromirror is adjustable for directing an optical signal from the input micromirrors 432 to associated output microlenses in output microlens array 450). As depicted in FIG. 4, output micromirrors 442 are disposed in hermetically sealed region 444. In one embodiment, in which hermetically sealed region 444 includes nitrogen, beam steering angles produced by output micromirrors 442 for directing light beams are adapted due to the interface between solid signal propagating material 402 and the hermetically sealed nitrogen region.

As depicted in FIG. 4, each output micromirror 442 is individually adjustable such that each output micromirror 442 may reflect light beams over a range of reflection angles (i.e., at a range of beam steering angles). In one such embodiment, each output micromirror 442 may be tilted in various directions for producing desired beam steering angles for directing a light beam from an input optical fiber to a selected one of a plurality of output optical fibers. In other words, each of the output micromirrors 432 is adapted for reflecting a light beam from a respective one of the input micromirrors 432 to one of a plurality of output microlenses of output microlens array 450.

As depicted in FIG. 4, output microlens array 450 is coupled to surface $404_4$. In one embodiment, output microlens array 450 is coupled to surface $404_4$ using an adhesive. In one such embodiment, the adhesive is an index-matching adhesive (i.e., an adhesive having a refractive index matching both the refractive index of the solid signal propagating material 402 and the refractive index of output microlens array 450). The output microlens array 450 comprises a plurality of output microlenses $452_1$–$452_8$ (collectively, output microlenses 452). The output microlenses 422 are adapted for directing optical signals from to output micromirror array 440 to output fiber array 470.

As depicted in FIG. 4, optical switching mechanism 400 includes an input fiber array 460. The input fiber array 460 includes a plurality of input optical fibers $462_1$–$462_8$ (collectively, input optical fibers 462). As depicted in FIG. 4, input fiber array 460 is configured such that each of the input optical fibers $462_1$–$462_8$ is incident on respective input microlenses of the input microlens array 420. Specifically, input optical fibers $462_1$–$462_8$ are incident on input microlenses $422_1$–$422_8$, respectively, of input microlens array 420. In one embodiment, input optical fibers 462 comprise single mode fibers.

As depicted in FIG. 4, optical switching mechanism 400 includes an output fiber array 470. The output fiber array 470 includes a plurality of output optical fibers $472_1$–$472_8$ (collectively, output optical fibers 472). As depicted in FIG. 4, output fiber array 470 is configured such that each of the output optical fibers $472_1$–$472_8$ is incident on respective output microlenses of the output microlens array 450. Specifically, output optical fibers $472_1$–$472_8$ are incident on output microlenses $452_1$–$452_8$, respectively, of output microlens array 450. In one embodiment, output optical fibers 462 comprise single mode fibers.

In accordance with the present invention, by using separate input and output fiber arrays (illustratively, input fiber array 460 and output fiber array 470, respectively) optical switching mechanism 400 of FIG. 4 is adapted for switching a larger number of optical signals than optical switching mechanism 200 of FIG. 2 (i.e., optical switching mechanism 400 is adapted for switching eight different optical signal paths while optical switching mechanism 200 of FIG. 2 is adapted for switching four different optical signal paths). It should be noted that the increase in optical switching capacity achieved by optical switching mechanism 400 requires additional light directing components (e.g., additional microlens and micromirror arrays).

As depicted in FIG. 4, a sample optical signal path 480 includes a first portion $480_1$, a second portion $480_2$, a third portion $480_3$, a fourth portion $480_4$, and a fifth portion $480_5$. The sample optical signal path 480 is the beam path traversed by the optical signal from the input optical fiber on which the optical signal is received to the output optical fiber on which the optical signal is transmitted (i.e., from an input optical fiber to a selected one of a plurality of output optical fibers). The sample optical signal path 480 demonstrates the switching of an optical signal between optical fibers using the solid signal propagating material of the present invention.

The first portion $480_1$ includes propagation of a received optical signal from input optical fiber $462_7$ to input microlens $422_7$. The second portion $480_2$ includes propagation of the optical signal from input microlens $422_7$ to input micromirror $432_7$ (i.e., input microlens $422_7$ directs the signal towards input micromirror $432_7$). The third portion $480_3$ includes propagation of the optical signal from input micromirror $432_7$ to output micromirror $442_6$ (i.e., input micromirror $432_7$ directs the signal towards output micromirror $442_6$). The fourth portion $480_4$ includes propagation of the optical signal from output micromirror $442_6$ to output microlens $452_6$ (i.e., output micromirror $442_6$ directs the signal towards output microlens $452_6$). The fifth portion $480_5$ includes transmission of the signal from output microlens $452_6$ to output optical fiber $472_6$.

The use of a solid signal propagating material in accordance with the present invention reduces beam divergence, thereby relaxing a number of optical design constraints. For example, reducing of beam divergence enables the use of smaller diameter micromirrors, facilitating mirror design, as well as affording greater space around the micromirrors for supporting and actuating various other structures. The use of a solid signal propagating material having a refractive index greater than the refractive index of air (e.g., glass) enables projection of the beam waist after the microlens or a smaller beam waist. The use of a solid material enables direct attachment of various components to the solid material, thereby providing additional advantages.

In particular, as described herein, various components are coupled to the solid signal propagating material. In one embodiment, the components are bonded to the solid signal propagating material using an index-matching adhesive (i.e., adhesive having a refractive index substantially similar to the refractive index of the solid material). The bonding of components to the solid material reduces glass-air refractive index changes that introduce refractive losses. Furthermore, use of an adhesive having a refractive index similar to the refractive index of the solid signal propagating material minimizes refractive action across the coupling interface between the solid material and each of the respective components. Moreover, bonding the components to the solid signal propagating material reduces temperature and pressure dependencies, increases structural stability and mechanical stability, facilitates packaging, and the like.

Although depicted using specific shapes of solid signal propagating materials having specific numbers of surfaces and associated angles between the surfaces, those skilled in the art will appreciate that the present invention may be implemented using a solid signal propagating material having various other shapes, numbers of surfaces, and associated angles between surfaces. As such, the present invention is not intended to be limited to a specific shape, number of surfaces, or angles between the surfaces.

Although various embodiments which incorporate the teachings of the present invention have been shown and described in detail herein, those skilled in the art can readily devise many other varied embodiments that still incorporate these teachings.

What is claimed is:

1. An apparatus for receiving an optical signal from an optical input means and directing the optical signal to a selected one of a plurality of optical output means, comprising:

a solid signal propagating material having a refractive index greater than a refractive index of air, the solid signal propagating material comprising a first transparent surface optically cooperating with the optical input and output means, a second transparent surface optically cooperating with a first light directing mechanism, and a reflective surface optically cooperating with the first light directing mechanism; wherein a first reflecting component of the first light directing mechanism directing the received optical signal to a second reflecting component of the first light directing mechanism via the reflective surface of the signal propagating material;

the second reflecting component of the first light directing mechanism directing respective incident optical signal to the selected one of the plurality of optical output means; and the first light directing mechanism being disposed within a hermetically sealed region formed by a housing coupled to the second transparent surface, the hermetically sealed region comprising an environment, wherein an interface between the solid signal propagating material and the environment of the hermetically sealed region is adapted for modifying respective beam steering angles associated with the optical signals.

2. The apparatus of claim 1, wherein:

the first reflecting component directing the received optical signal from a second light directing mechanism to the reflective surface; and the first reflecting component directing the incident optical signal from the reflective surface to the second light directing mechanism.

3. The apparatus of claim 2, wherein the first transparent surface optically cooperates with the second light directing mechanism, the second light directing mechanism comprising a first directing component and a second directing component, wherein:

the first directing component directing the received optical signal from the optical input means to the first reflecting component; and the second directing component directing the incident optical signal from the second reflecting component to the selected one of the plurality of optical outputs means.

4. The apparatus of claim 3, wherein:

the first light directing mechanism comprising a micromirror array having a plurality of micromirrors, the first reflecting component comprising a first micromirror from the plurality of micromirrors and the second reflecting component comprising a second micromirror from the plurality of micromirrors; and the second light directing mechanism comprising a microlens array having a plurality of microlenses, the first directing component comprising a first microlens from the plurality of microlenses and the second directing component comprising a second microlens from the plurality of microlenses.

5. The apparatus of claim 1, the first transparent surface optically cooperating with a second light directing mechanism, wherein:

a first directing component of the second light directing mechanism directing the received optical signal from the optical input means to the first reflecting component of the first light directing mechanism; and a second directing component of the second light directing mechanism directing the respective incident optical signal from the second reflecting component of the first light directing mechanism to the selected one of the plurality of optical outputs means.

6. The apparatus of claim 5, wherein the second light directing mechanism comprises a microlens array having a plurality of microlenses, wherein:

the first directing component comprises a first microlens from the plurality of microlenses; and the second directing component comprises a second microlens from the plurality of microlenses.

7. The apparatus of claim 5, wherein:

the first reflecting component directing the received optical signal from the first directing component of the second light directing mechanism to the reflective surface; and the second reflecting component directing the incident optical signal from the reflective surface to the second directing component of the second light directing mechanism.

8. The apparatus of claim 7, wherein the first light directing mechanism comprises a micromirror array comprising a plurality of micromirrors, wherein:

the first reflecting component comprises a first micromirror from the plurality of micromirrors, the first micromirror directing the received optical signal from a first microlens to the reflective surface; and the second reflecting component comprises a second micromirror from the plurality of micromirrors, the second micromirror directing the incident optical signal from the reflective surface to a second microlens.

9. The apparatus of claim 1, wherein the reflective surface comprises one of a flat surface or a curved surface.

10. The apparatus of claim 1, wherein:

the housing forming the hermetically sealed region in which the first light directing mechanism is disposed being coupled to the second transparent surface of the solid signal propagating material using a first bond type, a second light directing mechanism being coupled to the first transparent surface of the solid signal propagating material using a second bond type; and the reflective surface being coupled to a third surface of the solid signal propagating material using the second bond type.

11. The apparatus of claim 10, wherein the first bond type comprises a solder bond and the second bond type comprising an adhesive bond.

12. The apparatus of claim 11, wherein the adhesive bond comprises adhesive material having a refractive index substantially similar to the refractive index of the solid signal propagating material.

13. An apparatus for receiving an optical signal from an optical input means and directing the optical signal to a selected one of a plurality of optical output means, comprising:

a solid signal propagating material having a refractive index greater than a refractive index of air, the solid signal propagating material comprising a first transparent surface optically cooperating with the optical input means, a second transparent surface optically cooperating with a first light directing mechanism, a third transparent surface optically cooperating with a second light directing mechanism, and a fourth transparent surface optically cooperating with the optical output means; wherein a first reflecting component of the first light directing mechanism directing the received optical signal to a second reflecting component of the second light directing mechanism;

the second reflecting component of the second light directing mechanism directing respective incident optical signal to the selected one of the plurality of optical output means; and the first and second light directing mechanisms being disposed within respective hermetically sealed regions formed by respective housings coupled to the respective second and third transparent surfaces, the hermetically sealed regions comprising respective environments, wherein respective interfaces between the solid signal propagating material and the environments of the hermetically sealed regions are adapted for modifying respective beam steering angles associated with the optical signals.

14. The apparatus of claim 13, further comprising:
a third light directing mechanism, the first transparent surface optically cooperating with the third light directing mechanism, the third light directing mechanism comprising a third directing component for directing the received optical signal from the input means to the first reflecting component.

15. The apparatus of claim 14, wherein the third light directing mechanism comprises a microlens array having a plurality of microlenses, the third directing component comprising a microlens from the plurality of microlenses.

16. The apparatus of claim 13, further comprising:
a fourth light directing mechanism, the fourth transparent surface optically cooperating with the fourth light directing mechanism, the fourth light directing mechanism comprising a fourth directing component for directing the incident optical signal from the second reflecting component to the selected one of the plurality of output means.

17. The apparatus of claim 16, wherein the fourth light directing mechanism comprises a microlens array having a plurality of microlenses, the fourth directing component comprising a microlens from the plurality of microlenses.

18. The apparatus of claim 13, wherein:
the first light directing mechanism comprising a first micromirror array, the first reflecting component comprising a first micromirror from the first micromirror array;
the second light directing mechanism comprising a second micromirror array, the second reflecting component comprising a second micromirror from the second micromirror array;
the first micromirror directing the received optical signal from a third light directing mechanism to the second micromirror; and
the second micromirror directing the incident optical signal from the first micromirror to a fourth light directing mechanism.

19. The apparatus of claim 13, wherein:
the housing forming the hermetically sealed region in which the first light directing mechanism is disposed is bonded to the second transparent surface of the solid signal propagating material; and
the housing forming the hermetically sealed region in which the second light directing mechanism is disposed is bonded to the third transparent surface of the solid signal propagating material;
the bonds being formed using an adhesive material adapted for forming a hermetic seal.

20. An apparatus for receiving an optical signal from an optical input means and directing the optical signal to a selected one of a plurality of optical output means, comprising:
a solid signal propagating material, the solid signal propagating material comprising at least one transparent surface optically cooperating with the optical input and output means and an additional transparent surface optically cooperating with a light directing mechanism; wherein
a first reflecting component of the light directing mechanism directing the received optical signal to a second reflecting component of the light directing mechanism;
the second reflecting component of the light directing mechanism directing respective incident optical signal to the selected one of the plurality of optical output means; and
the light directing mechanism being disposed within a hermetically sealed region formed by a housing coupled to the additional transparent surface, the hermetically sealed region comprising an environment, wherein an interface between the solid signal propagating material and the environment of the hermetically sealed region is adapted for modifying respective beam steering angles associated with the optical signals.

* * * * *